Patented Mar. 27, 1923.

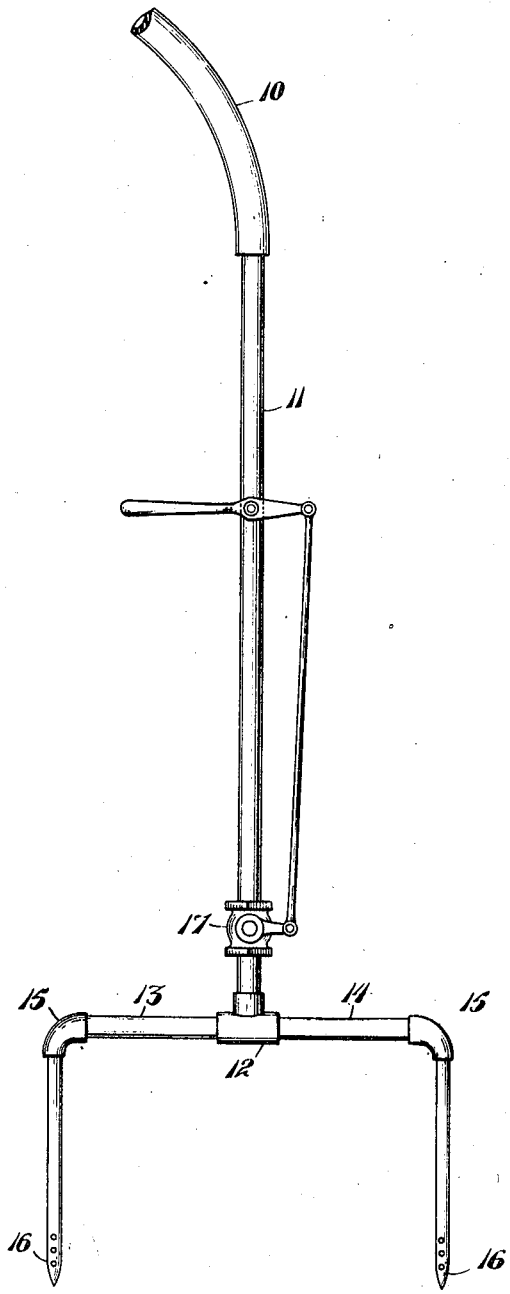

1,449,606

UNITED STATES PATENT OFFICE.

ALBERT HORNER, JR., OF KAPAA, KAUAI, HAWAII.

MEANS FOR TREATING PLANTS FOR DISEASE KNOWN AS PINEAPPLE WILT OR LAHAINA.

Application filed June 30, 1920. Serial No. 392,962.

*To all whom it may concern:*

Be it known that I, ALBERT HORNER, Jr., a citizen of the United States, residing at Kapaa, on the Island of Kauai and Territory of Hawaii, have invented a new and useful Improvement in Means for Treating Plants for Disease Known as Pineapple Wilt or Lahaina, of which the following is a specification.

This invention relates to a treatment of plants, particularly pineapple and cane which have been disastrously stricken by root rot and which has caused the roots to die and the plants to wilt away in the manner as though they were completely torn from the soil, this being technically known as pineapple wilt and Lahaina disease. Investigation so far indicates that this is caused by a newly discovered parasitic organism found in the roots of both cane and pineapple, and which has characteristics of the Critridineæ. It invades the roots of the plants, resulting in their destruction.

It is the principal object of the present invention, therefore, to provide a compound for the treatment of the plants which will eliminate any of the organisms producing dry rot, a disease known as "base rot" or plant chlorosis and which treatment may be very conveniently applied.

The application of the composition is illustrated by way of example in the accompanying drawings in which the figure discloses an apparatus by which the treatment may be administered.

Particularly considered, the invention consists in the provision of a composition of copper sulphate, $CUSO_4$, and iron sulphate $FeSO_4$ for application to the plant. In experiment, it has been found that this composition may be administered in a number of different ways, the most effective possible being to produce a solution containing one volume of copper sulphate and two volumes of iron sulphate dissolved in a hundred volumes of water and applied to the soil about the roots of the plant. The treatment may also be carried on to advantage by placing the solution in the irrigation water delivered to the plants and in fact, the soil may be treated by separately applying solutions of copper sulphate and iron sulphate which will co-mingle in the soil and produce the desired result. The plants may also be sprayed with the solution and as the mixture works down the stalks and around the roots will act to exterminate the organism. In some instances the copper sulphate and iron sulphate have been directly applied to the plant and the soil in crystallized or powdered form and will, of course, co-mingle to form the desired mixture when the soil becomes moistened and in any event, irrespective of the manner in which the chemicals are applied to the plant, the objectionable organism will be eliminated providing that a suitable dosage is given.

In the drawing a form of spray is illustrated by which the treatment might be administered and comprises a feed hose 10 connected with a rigid feed pipe 11. This pipe is fitted with a T fitting 12 carrying lateral pipes 13 and 14. The ends of these pipes carry pipe elbows 15 which connect with pointed nozzles 16. These nozzles may be forced into the soil near the plant and then the solution previously described allowed to flow into the soil as a valve 17 is opened, and the solution delivered under pressure.

It will thus be seen that by the provision of the chemicals here set forth the organism will be attached and the zoospores killed. Moreover, solutions of varying strengths may be used in treating for base rot of pineapples, chlorosis of pineapple, and other troubles of pineapple, sugar cane, and other plants, where the cause of the trouble rests in the soil or the plant roots.

Having thus described my invention, that I claim and desire to secure by Letters Patent, is:

A composition of matter, for application to the roots of plants afflicted with diseases of the character known as pineapple wilt and Lahaina disease, consisting of copper sulphate and iron sulphate.

In testimony whereof I have hereunto set my hand in the presence of two subscribing witnesses.

ALBERT HORNER, JR.

Witnesses:
H. T. BARCLAY,
M. CORREA.